United States Patent [19]
Swars et al.

[11] Patent Number: 5,585,073
[45] Date of Patent: Dec. 17, 1996

[54] ELECTRICALLY HEATED CATALYTIC CONVERTER

[75] Inventors: Helmut Swars; Rolf Brück, both of Bergisch Gladbach, Germany

[73] Assignee: Emitec Gesellschaft fuer Emissions-technologie, Lohmar, Germany

[21] Appl. No.: 484,664

[22] Filed: Jun. 7, 1995

Related U.S. Application Data

[63] Continuation of PCT/EP94/00115 Jan. 18, 1994 published as WO94/17290 Aug. 4, 1994.

[30] Foreign Application Priority Data

Jan. 26, 1993 [DE] Germany ................. 43 02 039.9

[51] Int. Cl.$^6$ ..................................... F01N 3/10
[52] U.S. Cl. ............... 422/174; 422/180; 422/199; 422/222; 60/300; 502/439; 502/527; 55/DIG. 30
[58] Field of Search ................. 422/174, 199, 422/177, 211, 180, 222; 60/300; 502/439, 527; 428/593, 596; 55/DIG. 30

[56] References Cited

U.S. PATENT DOCUMENTS

| | | | |
|---|---|---|---|
| 5,370,943 | 12/1994 | Bruck et al. | 422/174 |
| 5,433,926 | 7/1995 | Swars | 60/300 |
| 5,436,216 | 7/1995 | Toyao et al. | 502/439 |

FOREIGN PATENT DOCUMENTS

| | | |
|---|---|---|
| 4131970 | 4/1992 | Germany. |
| 5-171928 | 7/1993 | Japan. |
| 89/10471 | 11/1989 | WIPO. |
| 92/13635 | 8/1992 | WIPO. |
| 92/13636 | 8/1992 | WIPO. |

*Primary Examiner*—Robert J. Warden
*Assistant Examiner*—Hien Tran
*Attorney, Agent, or Firm*—Herbert L. Lerner; Laurence A. Greenberg

[57] ABSTRACT

A catalytic converter with electric heating includes a housing and at least one honeycomb body being disposed in the housing for conducting a flow of exhaust gas of an internal combustion engine through the honeycomb body in a given flow direction. The honeycomb body is electrically conductive at least in partial regions upon being heated by an electric current and it has a catalytically active coating at least in partial regions. The honeycomb body has at least two electrically heatable partial regions being disposed in succession as seen in the given flow direction. The electrically heatable partial regions have a different axial length and/or a different electrical resistance. The honeycomb body also has at least one other partial region being at least substantially blocked to the electric current and separating the electrically heatable partial regions from one another.

29 Claims, 3 Drawing Sheets

5,585,073

ELECTRICALLY HEATED CATALYTIC CONVERTER

CROSS-REFERENCE TO RELATED APPLICATION

This application is a Continuation of International Application Ser. No. PCT/EP94/00115, filed Jan. 18, 1994.

BACKGROUND OF THE INVENTION

Field of the Invention

The present invention relates to a catalytic converter with electric heating, including a housing containing at least one honeycomb body configuration through which an exhaust gas of an internal combustion engine can flow in a flow direction, the honeycomb body configuration being electrically conductive at least in partial regions, being heatable and having a catalytically active coating at least in partial regions.

Electrically heated catalytic converters are described, for instance, in U.S. Pat. No. 5,146,743. A more sophisticated construction, which is the point of departure for the present invention, is described in International Patent Application WO 92/02714, corresponding to U.S. Pat. No. 5,411,711. It is also known to heat the honeycomb bodies that are used in electrically heatable catalytic converters, nonhomogenously. To that end, International Patent Application WO 92/13635, corresponding partially to U.S. application Ser. No. 08/353,964, filed Dec. 12, 1994, proposes perforating metal foils used in the honeycomb body with slits or holes, in order to influence a current distribution.

The known structures for electrically heatable honeycomb bodies, while fundamentally suitable for most applications, nevertheless make it difficult, for various given peripheral conditions, to create standardized models that are mechanically stable and at the same time meet the electrical and thermodynamic demands made of them.

It has been found that electrically heatable catalytic converters have to be adapted to virtually each vehicle type, if optimal results are to be attained. In order to do so, first a maximum current intensity available for heating must be taken into account, and an electrical resistance of the honeycomb body, at a given supply voltage (usually 8 to 12 V) must orient itself thereto. Since an electrically heatable honeycomb body should be disposed as close as possible to and upstream of a following non-heatable catalytic converter, such as a precatalyst or a main catalyst, the diameter of the electrically heatable honeycomb body must be adapted to those given situations. Moreover, the available heating area in proportion to the heated mass is important, which makes it desirable to be able to vary that proportion over a wide range. It is precisely that which is quite difficult in the known models having a fixed resistance and a fixed diameter. In particular, certain peripheral conditions would require quite axially short heatable honeycomb bodies, which are not sufficiently stable mechanically and above all cannot withstand the vibrations that occur in motor vehicles.

SUMMARY OF THE INVENTION

It is accordingly an object of the invention to provide an electrically heated catalytic Converter, which overcomes the hereinafore-mentioned disadvantages of the heretofore-known devices of this general type and which can be standardized with respect to its dimensions yet nevertheless enables adaptation to given peripheral conditions over wide ranges. A proportion between a heating surface area and a mass to be heated should be adjustable, and a proportion between heated surface areas and catalytically active surface areas should also be variable.

With the foregoing and other objects in view there is provided, in accordance with the invention, a catalytic converter with electric heating, comprising a housing; and at least one honeycomb body being disposed in the housing for conducting a flow of exhaust gas of an internal combustion engine through the at least one honeycomb body in a given flow direction; the at least one honeycomb body being electrically conductive at least in partial regions upon being heated by an electric current; the at least one honeycomb body having a catalytically active coating at least in partial regions; the at least one honeycomb body having at least two electrically heatable partial regions disposed in succession as seen in the given flow direction, the electrically heatable partial regions having a different axial length and/or a different electrical resistance; and the at least one honeycomb body having at least one other partial region being at least substantially blocked to the electric current, the at least one other partial region separating the electrically heatable partial regions from one another.

The honeycomb body configuration is subdivided by slits and/or electrically poorly conductive zones in such a way as to produce at least two electrically heatable partial regions.

In accordance with another feature of the invention, the electric current has a given direction, and the at least one honeycomb body has a multiplicity of slits formed therein extending approximately crosswise or obliquely to the direction of the electric current.

The invention proceeds from the fact that a catalytic conversion in a catalytic converter does not take place to a significant extend until beyond temperatures of approximately 300° to 450° C. If a large honeycomb body is therefore heated slowly, then initially a catalytic conversion does not occur anywhere. If instead one rapidly heats only a very axially short area with a small heated mass, then the catalytic conversion begins early there. The prerequisite therefor is that the surface of that area not be too large in proportion to the heating output and to the mass throughput of exhaust gas, which is still cold in the cold starting phase. In the rapidly heated area, an exothermic reaction ensues, which jointly activates the chemical energy contained in the exhaust gas during the cold starting phase in order to heat the catalytic converter. The electrical energy stored in the rapidly heated area, and the chemical energy converted there, heat the exhaust gas and directly following partial regions of the catalytic converter jointly, but from the end of the heated area on the temperature drops again, since the following part of the catalytic converter functions as a heat sink. At a short distance downstream of the heated area, the temperature therefore drops back below 300° C., so that catalytic conversion no longer occurs there. According to the invention, a further heatable partial region is provided there in order to raise the temperature again to a range which is suitable for catalytic conversion. However, while the first heatable partial region must heat the exhaust gas from 150° C. to 450° C., for instance, the second heatable partial region must raise the temperature only from 300° C. to 450° C., for instance. It is readily apparent that less electrical power is needed therefor than must be employed in the first heatable region. The second heatable partial region should therefore have higher resistance than the first heatable partial region, which can be achieved either by a different construction or by a shorter axial length.

In accordance with a further feature of the invention, the first electrically heated partial region has from twice to four times the axial length of the second electrically heated partial region. If the structure is otherwise the same in both partial regions, this accordingly raises the resistance in the second partial region by a factor of 2 to 4.

With regard to the mechanical strength of the honeycomb body configuration, it is advantageous if at least one non-directly heatable partial region is disposed between the electrically heatable partial regions.

In accordance with an added feature of the invention, in order to enable utilization of this surface area for the catalytic conversion, this partial region has a catalytically active coating. Although this area is not directly heatable, nevertheless it is jointly heated by the two directly electrically heatable partial regions, so that this directly heatable partial region still contributes to the catalytic conversion.

In accordance with an additional feature of the invention, in order to meet stringent environmental protection laws, a rapid onset of catalytic conversion is necessary, and therefore the first electrically heatable partial region is constructed, in terms of its axial length, its electrical resistance, its mass and its surface area, in such a way that at a given supply voltage, such as 8 to 12 V, it is heated in the exhaust gas stream of the engine during a cold-starting phase to approximately 450° C. within from 3 to 5 seconds. As discussed in further detail below in terms of exemplary embodiments, the structural form according to the invention still allows this condition to be met yet with a mechanically stable structure.

In accordance with yet another feature of the invention, the partial region, which is located downstream of the first electrically heatable partial region and is not directly heatable, should also have an axial length, mass and surface area such that the temperature drop during the cold-starting phase of the engine, over its axial length and taking into account exothermic reactions, is only approximately 50° to 150° C. for an inlet temperature of 450° C. In this kind of embodiment, practically the entire non-directly heatable partial region nevertheless contributes very early to the catalytic conversion and thus lowers pollutant emissions during the cold starting phase.

In accordance with yet a further feature of the invention, the second electrically heatable partial region is constructed with respect to its axial length, its electrical resistance, its mass and its surface area, in such a way that at a given supply voltage, during a cold-starting phase of the engine, at an inlet temperature of 400° C. and taking into account exothermic reactions in this partial region, it brings about a temperature increase of from 50° to 150° C.

In accordance with yet an added feature of the invention, the second electrically heatable partial region is followed by a further partial region with a catalytically active coating that then likewise contributes early to the catalytic conversion. In principle, further electrically heatable and non-heatable partial regions can follow, with their effect each corresponding to the effects described above.

In accordance with yet an additional feature of the invention, it is especially advantageous if the entire honeycomb body configuration, or in other words both the heatable and the non-heatable partial regions, are coated with catalytically active material.

In principle it is possible for each partial region of the honeycomb body configuration to include a separate honeycomb body, with the honeycomb bodies being disposed one after the other.

However, in accordance with again another feature of the invention, the honeycomb body configuration includes a single honeycomb body, which is assembled from structured sheet-metal layers and is subdivided into at least three axially successive partial regions, namely a first electrically heatable partial region, a following partial region that is electrically non-continuously conductive at least in one direction as a result of a number of slits in the sheet-metal layers and therefore is not directly heatable, and a following second heatable partial region. This configuration is especially simple and economical to make and is especially stable mechanically. Unlike the disclosures of the prior art, in this case the slits are used in order to completely prevent a flow of current in a partial region.

In accordance with again a further feature of the invention, the slits are disposed crosswise or at an angle to the direction of the electrical potential, so that no electrical current flows in the sheet-metal regions between the slits. In most known structures for electrically heatable honeycomb bodies, especially that described in International Patent Application WO 92/02714, corresponding to U.S. Pat. No. 5,411,711, that means that the slits extend approximately in the flow direction or at an acute angle to it, thereby preventing an electrical flow of current crosswise to the flow direction. However, the axial stability of the partial region is preserved since the slits have virtually no effect on the stability. The heatable partial regions are joined together so axially stably that that body has a high axial mechanical strength even if the electrically heatable partial regions are axially very short. For the sake of axial stability, slits extending precisely parallel to the flow direction would be the most favorable, but slits extending slightly obliquely to the flow direction behave more favorably when steel layers or sheets are bent and especially when they are corrugated, so that the latter form is preferred.

In accordance with again an added feature of the invention, for many applications an axial length of all of the electrically heatable regions together of between 4 and 20 mm and preferably 6 to 16 mm is favorable.

In accordance with again an additional feature of the invention, the axial length of the first electrically heatable partial region is between 2 and 10 mm and preferably approximately 6 mm.

In accordance with still another feature of the invention, a range from 75 to 105 mm, and preferably approximately 90 mm, has proved to be favorable for the diameter of the honeycomb body configuration.

In accordance with still a further feature of the invention, the total axial length of the honeycomb body configuration should be between 12 and 40 mm and preferably approximately 25 mm, to attain a sufficient mechanical stability.

In accordance with still an added feature of the invention, the invention can be realized not only by honeycomb bodies assembled from individual metal layers but also by way of example by a single extruded honeycomb body, which is subdivided into axially successive partial regions having an electrical resistance that increases in the flow direction. It is known to make electrically conductive honeycomb bodies from metal powder or a mixture of ceramic powder and metal powder by extrusion, with the electrical resistance being adjustable by the mixture ratio between the metal powder and the ceramic powder. The resistance in individual regions of such a honeycomb body can also be varied by a subsequent treatment, such as oxidation or etching, so that partial regions of differing electrical resistance are easy to make.

Therefore an extruded honeycomb body can also have three axially successive partial regions, namely a first electrically conductive and heatable partial region, an electrically poorly conductive partial region following it that is therefore not directly heatable, and a second electrically conductive and heatable partial region following that. The effect of these partial regions is equivalent to the effects described above.

In accordance with still an additional feature of the invention, the extruded honeycomb body is formed of predominantly metal material in the highly conductive partial regions, and it is formed of predominantly ceramic material or metal material of high porosity in the poorly conductive regions.

In accordance with a concomitant feature of the invention, the honeycomb body can also include five partial regions, of which either three or two are directly heatable electrically.

Other features which are considered as characteristic for the invention are set forth in the appended claims.

Although the invention is illustrated and described herein as embodied in an electrically heated catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
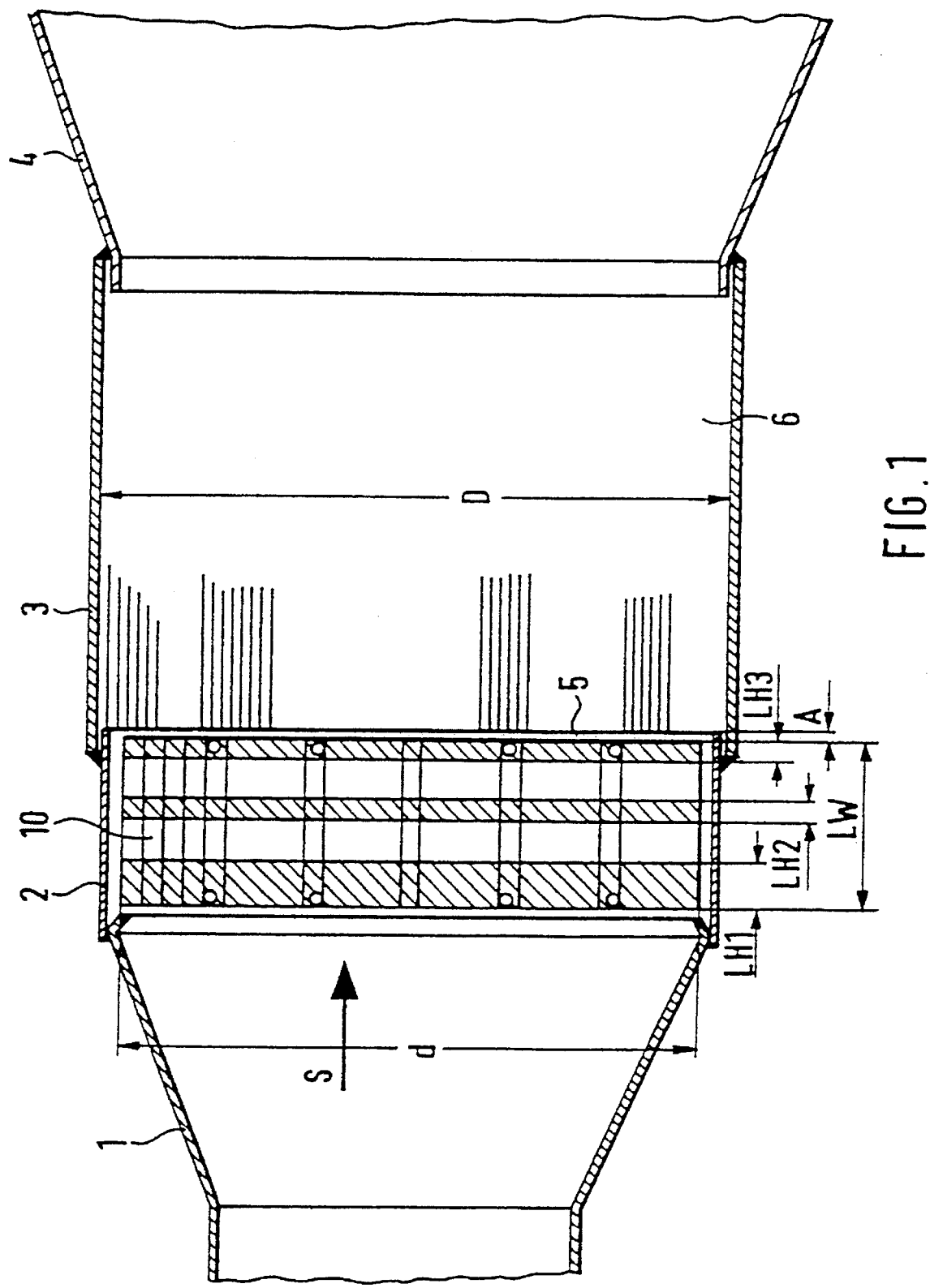
FIG. 1 is a fragmentary, diagrammatic, longitudinal-sectional view of a portion of an exhaust gas system in a motor vehicle, having a honeycomb body configuration according to the invention and a precatalyst disposed directly downstream thereof.

Referring now to the figures of the drawing in detail and first, particularly, to FIG. 1 thereof, there is seen a diagrammatic, longitudinal section of a portion of an exhaust gas system of a motor vehicle, specifically a honeycomb body configuration 10, that is electrically heatable in partial regions and is located directly upstream of a precatalyst 6. Exhaust gas enters the honeycomb body configuration 10, which is accommodated in a housing 2, through an inflow diffusor 1, in a flow direction S. The precatalyst 6 is disposed in a housing 3 following the housing 2, and only a very small gap 5 with a width A is present between the honeycomb body configuration 10 and the precatalyst 6. The precatalyst 6 is followed by a diffusor 4, downstream of which a non-illustrated main catalyst is disposed. The honeycomb body configuration 10 has a diameter d, and the precatalyst 6 has a diameter D. An axial length LW of the honeycomb body configuration 10 and axial lengths LH1, LH2 and LH3 of heatable 10 partial regions are shown once again as being spread apart in the axial direction, in FIG. 1.

Figure 3:
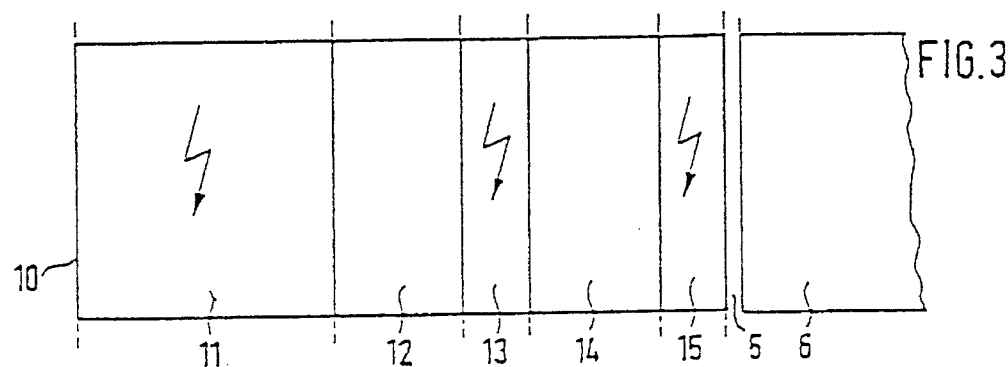
FIG. 3 is a fragmentary, longitudinal-sectional view of a structure of a catalyst configuration according to the invention.

FIG. 3 shows the honeycomb body configuration 10 in a diagrammatic, longitudinal section. The honeycomb body configuration 10 has a first electrically heatable partial region 11, a following non-heatable other partial region 12, a following second partial region 13 that is again electrically heatable, a following other partial region 14 that is non-heatable, and a third electrically heatable partial region 15. However, simpler configurations according to the invention may include fewer partial regions that are disposed correspondingly. The honeycomb body configuration can have either a non-heatable partial region or a heatable partial region as its frontmost disk. Preferably, however, it will have a heatable partial region as its frontmost disk.

Figure 2:
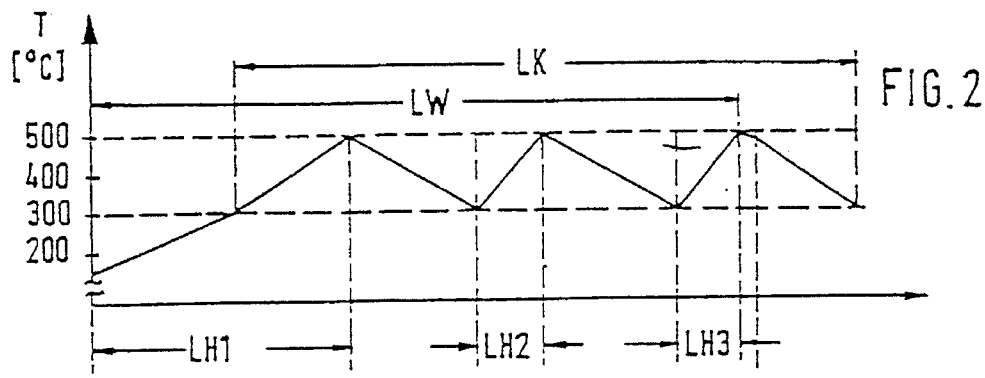
FIG. 2 is a diagram illustrating a temperature course during heating in a cold starting phase.

FIG. 2, which is related in spatial terms to FIG. 3, shows a temperature course in the honeycomb body configuration during a cold starting phase, in which the electrically heatable partial regions are heated. Cold exhaust gas flows to the partial region 11 at a temperature of 150° C., for instance, and is initially heated to 300° C. At that temperature, an exothermic catalytic conversion begins, so that further heating takes place through both electrical and chemical energy, and a following temperature rise to approximately 500° C. is somewhat steeper. In the following, non-heatable partial region 12, the temperature then drops from 500° C. to 300° C., but is still above the temperature which is necessary for the catalytic conversion, so that a catalytic conversion takes place within the entire partial region 12. The electrically heatable partial region 13 raises the temperature back to 500° C., while in the following, non-heatable partial region 14, the temperature drops again to approximately 300° C. The electrically heatable partial region 15 raises the temperature to 500° C. again, and the temperature then drops in the gap 5 and in the following precatalyst 6 to 300° C. again. A catalytic conversion thus takes place over an entire length LK, or in other words from approximately the middle of the first electrically heatable partial region 11 to the inside of the precatalyst 6. An entire electrically heatable length LH is composed of the three lengths LH1, LH2 and LH3 of the heatable partial regions 11, 13, 15. As can be seen, within certain limits the length LW of the honeycomb body 10 is independent of the total length LH of the heatable regions. Moreover, the length LK over which a catalytic conversion takes place is greater than the total length LH of the heatable regions.

Figure 4:
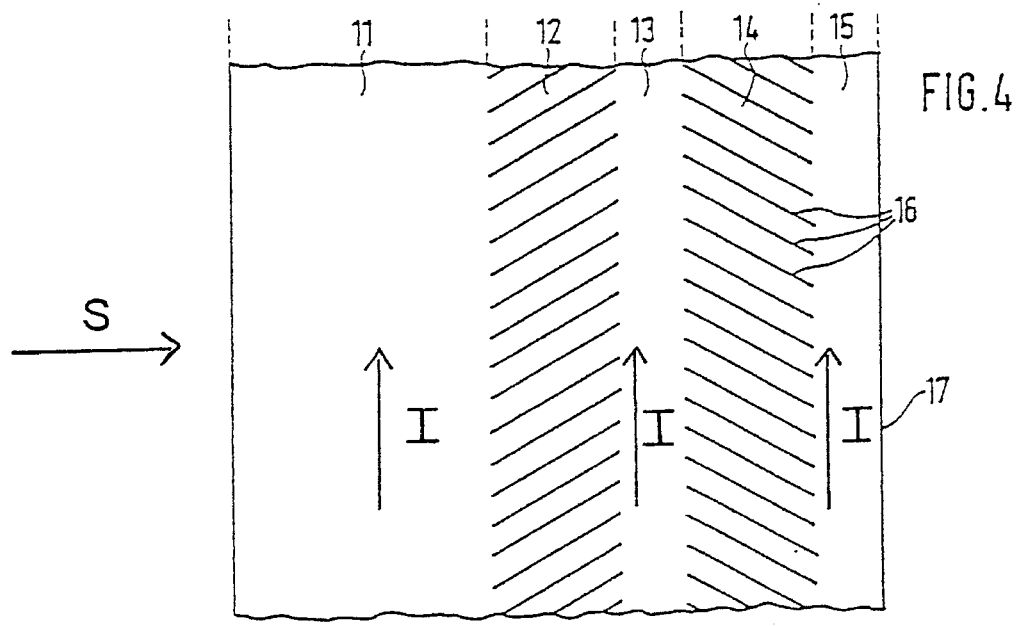
FIG. 4 is a fragmentary, elevational view of a piece of a sheet-metal strip or layer which is suited to a honeycomb body configuration according to the invention.

FIG. 4, which is also related in spatial terms to FIG. 3, illustrates a basic structure of a sheet-metal strip or layer 17 with slits 16 of a kind that are suitable for making a honeycomb body configuration 10 corresponding to the structure of International Patent Application WO 92/02714, corresponding to U.S. Pat. No. 5,411,711, which is hereby entirely incorporated by reference. If a voltage is applied to non-illustrated ends of the sheet-metal strip or layer 17, then the current flows practically only within the regions 11, 13 and 15, but not in the regions 12 and 14, since there the slits prevent any significant flow of current. The foil 17 can be either a smooth foil or a corrugated foil. The precise form and configuration of the slits 16 is not of decisive importance, as long as in their entirety they prevent a flow of current which is crosswise to the flow direction in the regions 12 and 14.

Figure 5:
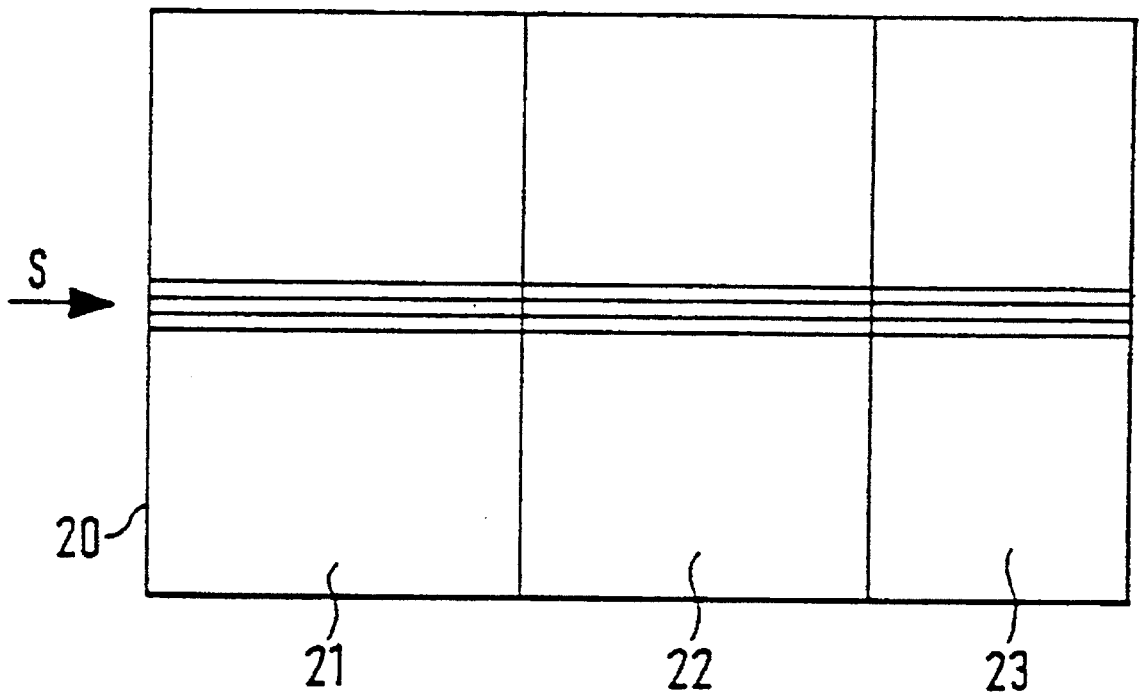
FIG. 5 is a longitudinal-sectional view of a structure of an extruded honeycomb body with three partial regions.

FIG. 5 diagrammatically shows a structure of an extruded honeycomb body configuration 20 with a first electrically heatable partial region 21, a non-electrically-heatable partial region 22, and a second electrically heatable partial region 23. The partial region 21 has a high proportion of metal, while the region 22 has a higher proportion of ceramic. In principle, in extruded honeycomb bodies, an electrical resistance that increases continuously in the flow direction can be attained by suitably varying the mixture of metal and ceramic components in the extrusion, and thus again, in an especially favorable way, it attains the object of the invention.

The following tables show how honeycomb body configurations according to the invention can be standardized and how broad the allowable ranges for the various parameters are. The tables relate to structural forms in accordance with International Patent Application WO 92/02714, corresponding to U.S. Pat. No. 5,411,711, and the adjacent columns disposed alongside one another relate to models for electrical outputs of 750 W, 1000 W, 1500 W, 2000 W and 3000 W. In the rows disposed one below another, three different diameters d of the honeycomb body configuration are shown, namely 76 mm, 86 mm and 96 mm, pertaining to corresponding diameters D of precatalysts of 80 mm, 90 mm and 100 mm, respectively.

TABLE 1

| No. | Unit Meas. | 750 W | 1000 W | 1500 W | 2000 W | 3000 W |
|---|---|---|---|---|---|---|
| 1 | mm | D = 80 | D = 80 | D = 80 | D = 80 | D = 80 |
|  | mm | d = 76 | d = 76 | d = 76 | d = 76 | d = 76 |
|  | mm | LW = 17.5 | LW = 17,5 | LW = 17,5 | LW = 17.5 | LW = 26 |
|  | mm | LH = 6,5 | LH = 8,5 | LH = 13 | LH = 17.5 | LH = 26 |
|  | g | m = 10 | m = 13 | m = 19 | m = 26 | m = 39 |
|  | $m^2$ | FH = 0,04 | FH = 0,05 | FH = 0,08 | FH = 0,11 | FH = 0,17 |
|  | layers | 7 | 7 | 7 | 7 | 7 |
|  | corrugated | 3 | 3 | 3 | 3 | 3 |
|  | $cm^3$ | V = 32 | V = 42 | V = 65 | V = 88 | V = 130 |
| 2 | mm | D = 90 | D = 90 | D = 90 | D = 90 | D = 90 |
|  | mm | d = 86 | d = 86 | d = 86 | d = 86 | d = 86 |
|  | mm | LW = 17,5 | LW = 17.5 | LW = 17,5 | LW = 17.5 | LW = 28 |
|  | mm | LH = 6 | LH = 8.5 | LH = 14 | LH = 17.5 | LH = 28 |
|  | g | m = 13 | m = 18 | m = 30 | m = 38 | m = 60 |
|  | $m^2$ | FH = 0.06 | FH = 0,08 | FH = 0.13 | FH = 0,16 | FH = 0,26 |
|  | layers | 9 | 9 | 9 | 9 | 9 |
|  | corrugated | 4 | 4 | 4 | 4 | 4 |
|  | $cm^3$ | V = 38 | V = 54 | V = 89 | V = 111 | V = 178 |
| 3 | mm | D = 100 | D = 100 | D = 100 | D = 100 | D = 100 |
|  | mm | d = 96 | d = 96 | d = 96 | d = 96 | d = 96 |
|  | mm | LW = 17.5 | LW = 17.5 | LW = 17.5 | LW = 20 | LW = 30 |
|  | mm | LH = 7 | LH = 10 | LH = 14 | LH = 20 | LH = 30 |
|  | g | m = 16,7 | m = 24 | m = 33,5 | m = 48 | m = 72 |
|  | $m^2$ | FH = 0.07 | FH = 0.1 | FH = 0.141 | FH = 0,21 | FH = 0,31 |
|  | layers | 9 | 9 | 9 | 9 | 9 |
|  | corrugated | 4 | 4 | 4 | 4 | 4 |
|  | $cm^3$ | V = 55 | V = 78.5 | V = 110 | V = 157 | V = 235,5 |

TABLE 2

| No. | Unit Meas. | 750 W | 1000 W | 1500 W | 2000 W | 3000 W |
|---|---|---|---|---|---|---|
| 1 | mm | D = 80 | D = 80 | D = 80 | D = 80 | D = 80 |
|  | mm | d = 76 | d = 76 | d = 76 | d = 76 | d = 76 |
|  | mm | LW = 17.5 | LW = 17.5 | LW = 17.5 | LW = 17.5 | LW = 26 |
|  | mm | LH = 6,5 | LH = 8,5 | LH = 13 | LH = 17.5 | LH = 26 |
|  | g | m = 9 | m = 12 | m = 18 | m = 24 | m = 36 |
|  | $m^2$ | FH = 0.04 | FH = 0,053 | FH = 0.08 | FH = 0,106 | FH = 0,159 |
|  | layers | 7 | 7 | 7 | 7 | 7 |
|  | corrugated | 3 | 3 | 3 | 3 | 3 |
|  | $cm^3$ | V = 30.2 | V = 44 | V = 60.4 | V = 88 | V = 120.8 |
| 2 | mm | D = 90 | D = 90 | D = 90 | D = 90 | D = 90 |
|  | mm | d = 86 | d = 86 | d = 86 | d = 86 | d = 86 |
|  | mm | LW = 17,5 | LW = 17.5 | LW = 17.5 | LW = 17.5 | LW = 28 |
|  | mm | LH = 6 | LH = 8,5 | LH = 14 | LH = 17.5 | LH = 28 |
|  | g | m = 13,5 | m = 18 | m = 27 | m = 36 | m = 54 |
|  | $m^2$ | FH = 0.05 | FH = 0.065 | FH = 0,1 | FH = 0.13 | FH = 0.195 |
|  | layers | 9 | 9 | 9 | 9 | 9 |
|  | corrugated | 4 | 4 | 4 | 4 | 4 |
|  | $cm^3$ | V = 41.3 | V = 55 | V = 82.5 | V = 111 | V = 165 |
| 3 | mm | D = 100 | D = 100 | D = 100 | D = 100 | D = 100 |
|  | mm | d = 96 | d = 96 | d = 96 | d = 96 | d = 96 |
|  | mm | LW = 17.5 | LW = 17.5 | LW = 17,5 | LW = 20 | LW = 30 |

TABLE 2-continued

| Unit No. | Meas. | 750 W | 1000 W | 1500 W | 2000 W | 3000 W |
|---|---|---|---|---|---|---|
| | mm | LH = 7 | LH = 10 | LH = 14 | LH = 20 | LH = 30 |
| | g | m = 16 | m = 21.5 | m = 32.5 | m = 43 | m = 65 |
| | $m^2$ | FH = 0.07 | FH = 0.094 | FH = 0.141 | FH = 0.187 | FH = 0.282 |
| | layers | 9 | 9 | 9 | 9 | 9 |
| | corrugated | 4 | 4 | 4 | 4 | 4 |
| | $cm^3$ | V = 59 | V = 78.5 | V = 118 | V = 157 | V = 235.5 |

The abbreviations in the tables have the following meanings:

LW=length of the honeycomb body configuration;
LH=total axial length of the heated regions;
m=mass;
FH=heatable surface area; and
V=volume.

The tables differ in the mass and the heatable surface area. The tables also show how many intertwined layers are used to form such a honeycomb body, and how many of these layers are corrugated. High-temperature-corrosion proof metal layers of iron-chromium-aluminum alloys are typically used, with a thickness of from 0.04 to 0.1 mm, as the sheet-metal layers. As can be seen from the tables, the honeycomb bodies according to the invention are especially suitable for the lower electrical power ranges of 750 W, 1000 W or 1500 W. In the case of the higher power ranges, the standardization can be extended by heating the entire honeycomb body electrically (or in other words by no longer subdividing it into partial regions) and optionally increasing its axial length. However, it is precisely for the lower power ranges, with standard diameters and standard lengths of the honeycomb body configuration, the possibility arises of achieving favorable properties in terms of the warmup time in the cold starting phase.

We claim:

1. A catalytic converter with electric heating, comprising:
a housing; and
at least one honeycomb body being disposed in said housing for conducting a flow of exhaust gas of an internal combustion engine through said at least one honeycomb body in a given flow direction;
said at least one honeycomb body being electrically conductive at least in electrically heatable partial regions upon being heated by an electric current, which flows substantially perpendicular to the given flow direction of the exhaust gas of the internal combustion engine;
said at least one honeycomb body having a catalytically active coating at least in electrically heatable partial regions;
said at least one honeycomb body having at least two electrically heatable partial regions disposed in succession in said given flow direction, each of said electrically heatable partial regions having an axial length parameter and an electrical resistance parameter, at least one of said parameters being different in said electrically heatable partial regions; and
said at least one honeycomb body having at least one non-heatable partial region coated with a catalytically active material and being at least substantially blocked to the electric current, said at least one non-heatable partial region separating said electrically heatable partial regions from one another.

2. The catalytic converter according to claim 1, wherein said at least one non-heatable partial region has a multiplicity of slits formed therein extending approximately crosswise to the direction of the electric current.

3. The catalytic converter according to claim 1, wherein said at least one non-heatable partial region has a multiplicity of slits formed therein extending approximately obliquely to the direction of the electric current.

4. The catalytic converter according to claim 1, wherein said at least two electrically heatable partial regions include first and second electrically heatable partial regions, and said first electrically heatable partial region has a greater axial length than said second electrically heatable partial region.

5. The catalytic converter according to claim 4, wherein said first electrically heatable partial region has between twice and four times the axial length of said second electrically heatable partial region.

6. The catalytic converter according to claim 1, wherein said at least two electrically heatable partial regions include first and second electrically heatable partial regions, and said second electrically heatable partial region has a greater electrical resistance than said first electrically heatable partial region.

7. The catalytic converter according to claim 6, wherein said second electrically heatable partial region has between twice and four times the resistance of said first electrically heatable partial region.

8. The catalytic converter according to claim 1, wherein said at least two electrically heatable partial regions include first and second electrically heatable partial regions, and said first electrically heatable partial region has an axial length, an electrical resistance, a mass and a surface area permitting said first electrically heatable partial region to be heated in the exhaust gas stream of the engine to approximately 450° C. within from 3 to 15 seconds during a cold-starting phase, at a given supply voltage.

9. The catalytic converter according to claim 1, wherein said at least two electrically heatable partial regions include first and second electrically heatable partial regions, and said at least one non-heatable partial region with said catalytically active coating is disposed downstream of said first electrically heatable partial region in said given flow direction, is not directly heatable, and has an axial length, a mass and a surface area causing a temperature drop over the axial length of said at least one non-heatable partial region during a cold-starting phase of the engine, being only approximately 50° to 100° C. for an inlet temperature of 450° C., taking exothermic reactions in said at least one non-heatable partial region into account.

10. The catalytic converter according to claim 1, wherein said at least two electrically heatable partial regions include first and second electrically heatable partial regions, and said second electrically heatable partial region has an axial length, an electrical resistance, a mass and a surface area bringing about a temperature increase of from 50° to 100° C. at an inlet temperature of 400° C., at a given supply voltage and taking exothermic reactions in said second electrically heatable partial region into account, during a cold-starting phase of the engine.

11. The catalytic converter according to claim 1, wherein said at least two electrically heatable partial regions include first and second electrically heatable partial regions, and said at least one non-heatable partial region, being at least substantially blocked to the electric current and having said catalytically active coating, includes two non-heatable partial regions, one of said non-heatable partial regions is disposed downstream of said first electrically heatable partial region in said given flow direction, is not directly heatable, and has an axial length, a mass and a surface area causing a temperature drop over its axial length during a cold-starting phase of the engine, being only approximately 50° to 100° C. for an inlet temperature of 450° C., taking exothermic reactions in said one non-heatable partial region into account, and the other of said non-heatable partial regions is disposed downstream of said second electrically heatable partial region, in said given flow direction.

12. The catalytic converter according to claim 11, wherein said at least two electrically heatable partial regions include at least a third electrically heatable partial region disposed downstream of the other of said non-heatable partial regions, in said given flow direction.

13. The catalytic converter according to claim 1, wherein said at least one honeycomb body is assembled from structured sheet-metal layers and is subdivided into at least three axially successive partial regions, said axially successive partial regions including:

a first one of said at least two electrically heatable partial regions;

said at least one non-heatable partial region having a multiplicity of slits formed in said sheet-metal layers rendering said at least one non-heatable partial region electrically non-continuously conductive at least in one direction and therefore not directly heatable; and a second one of said at least two electrically heatable partial regions.

14. The catalytic converter according to claim 13, wherein said slits extend approximately in said given flow direction and prevent an electrical current flow crosswise to said given flow direction in said at least one non-heatable partial region but maintain axial stability of said at least one non-heatable partial region, for stably axially joining said first and second electrically heatable partial regions together with said at least one non-heatable partial region.

15. The catalytic converter according to claim 13, wherein said slits extend approximately at an acute angle to said given flow direction and prevent an electrical current flow crosswise to said given flow direction in said at least one non-heatable partial region but maintain axial stability of said at least one non-heatable partial region, for stably axially joining said first and second electrically heatable partial regions together with said at least one non-heatable partial region.

16. The catalytic converter according to claim 1, wherein said at least two electrically heatable partial regions together have a total axial length of between 4 and 20 mm.

17. The catalytic converter according to claim 1, wherein said at least two electrically heatable partial regions together have a total axial length of between 6 and 16 mm.

18. The catalytic converter according to claim 1, wherein said at least two electrically heatable partial regions include first and second electrically heatable partial regions, and said first electrically heatable partial region has an axial length of from 2 to 10 mm.

19. The catalytic converter according to claim 1, wherein said at least two electrically heatable partial regions include first and second electrically heatable partial regions, and said first electrically heatable partial region has an axial length of approximately 6 mm.

20. The catalytic converter according to claim 1, wherein said at least one honeycomb body has a diameter of from 75 to 105 mm.

21. The catalytic converter according to claim 1, wherein said at least one honeycomb body has a diameter of approximately 90 mm.

22. The catalytic converter according to claim 1, wherein said at least one honeycomb body has a total axial length of from 12 to 40 mm.

23. The catalytic converter according to claim 1, wherein said at least one honeycomb body has a total axial length of approximately 25 mm.

24. The catalytic converter according to claim 1, wherein said at least one honeycomb body is an extruded body having at least three axially successive partial regions, said at least three axially successive partial regions including:

a first one of said at least two electrically heatable partial regions being electrically conductive;

said at least one non-heatable partial region being electrically less conductive than said at least two electrically heatable partial regions and therefore not directly heatable; and a second one of said at least two electrically heatable partial regions being electrically conductive.

25. The catalytic converter according to claim 24, wherein said electrically heatable partial regions of said extruded honeycomb body are formed of predominantly metal material, and said at least one non-heatable partial region of said extruded honeycomb body is formed predominantly of a material selected from the group consisting of a ceramic material and a metal material of high porosity.

26. The catalytic converter according to claim 24, wherein said at least one honeycomb body includes three electrically heatable partial regions and two non-heatable partial regions, each two of the electrically heatable partial regions separated from each other by a respective non-heatable partial region.

27. The catalytic converter according to claim 25, wherein said at least one honeycomb body includes three electrically heatable partial regions and two non-heatable partial regions, each two of the electrically heatable partial regions separated from each other by a respective non-heatable partial region.

28. The catalytic converter according to claim 24, wherein said at least one honeycomb body includes two electrically heatable partial regions and three non-heatable partial regions, each two of the non-heatable partial regions separated from each other by a respective electrically heatable partial region.

29. The catalytic converter according to claim 25, wherein said at least one honeycomb body includes two electrically heatable partial regions and three non-heatable partial regions, each two of the non-heatable partial regions separated from each other by a respective electrically heatable partial region.

* * * * *